United States Patent [19]

Kaiser et al.

[11] Patent Number: 4,607,450
[45] Date of Patent: Aug. 26, 1986

[54] ENCLOSED MOUSETRAP HAVING IMPROVED TRAP MECHANISM

[75] Inventors: Dennis G. Kaiser; Robert D. Kaiser, both of Walled Lake, Mich.

[73] Assignee: AmCan, Inc., Warren, Mich.

[21] Appl. No.: 673,494

[22] Filed: Nov. 20, 1984

[51] Int. Cl.⁴ ............................................. A01M 23/30
[52] U.S. Cl. ......................................................... 43/83
[58] Field of Search .................. 43/77, 81, 83, 82, 83.5

[56] References Cited

U.S. PATENT DOCUMENTS

| | | | |
|---|---|---|---|
| 1,218,406 | 3/1917 | Jackson | 43/81 |
| 2,099,021 | 11/1937 | Landes | 43/81 |
| 2,492,957 | 1/1950 | Blair | 43/81 |
| 2,684,553 | 7/1954 | Schroeder | 43/81 |
| 3,992,803 | 11/1976 | Kaiser | 43/83 |
| 4,216,606 | 8/1980 | Kaiser | 43/83 |
| 4,341,033 | 7/1982 | Siegel | 43/83 |

Primary Examiner—Gene P. Crosby
Attorney, Agent, or Firm—Brooks & Kushman

[57] ABSTRACT

An enclosed mousetrap (10) has a trap mechanism (12) mounted on a back wall member (26) and having a bail wire (36) with a straight portion (42) that engages a downwardly projecting detent projection (66) of a catching member (58) in a line contact relationship to ensure effective operation of the enclosed mousetrap. The detent projection (66) is preferably stamped from sheet metal to include a lower surface (102) defined by a front ramp portion (104), a rear detent portion (106), and a lower curved portion (108) that extends between the ramp portion and the detent portion. The lower detent surface (102) preferably has a constantly increasing width in a rearward direction to provide the greatest length of line contact with the bail wire portion (42) in the cocked position to thereby provide frictional capability in holding the trap mechanism cocked.

6 Claims, 17 Drawing Figures

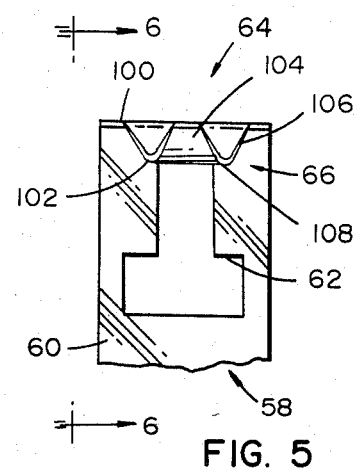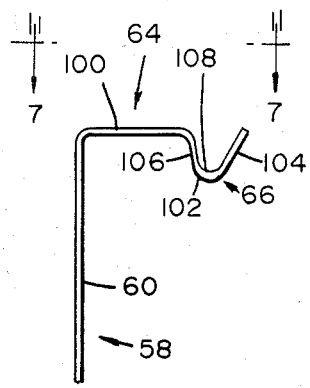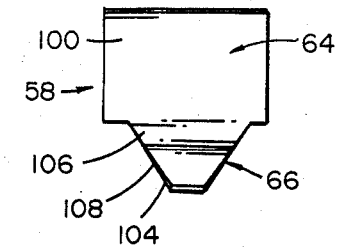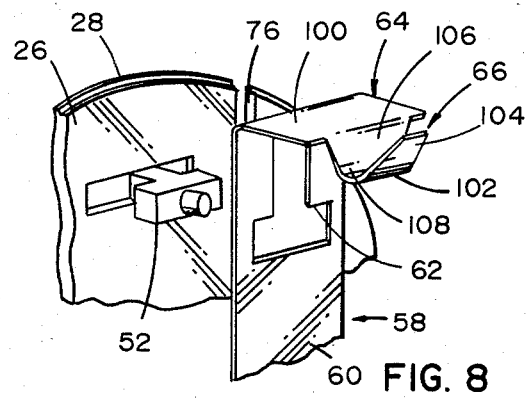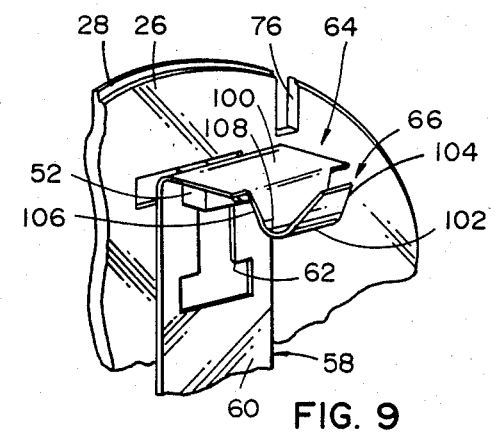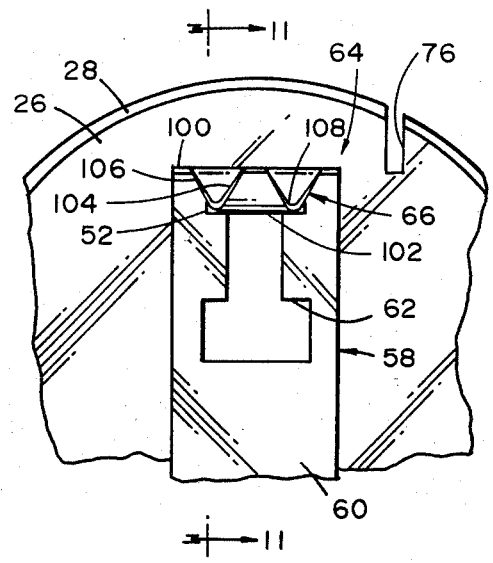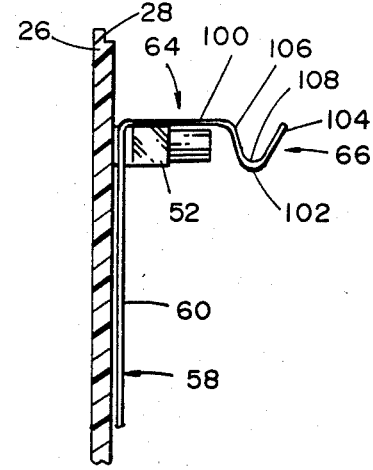

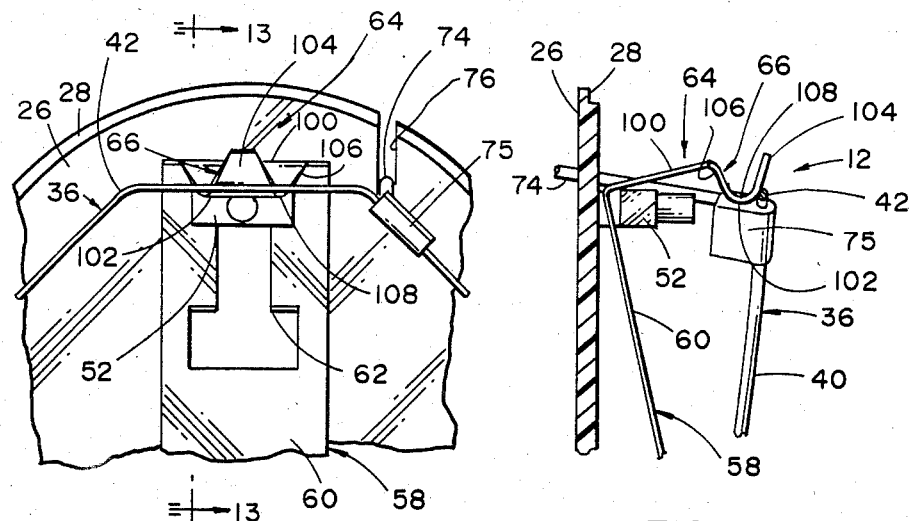
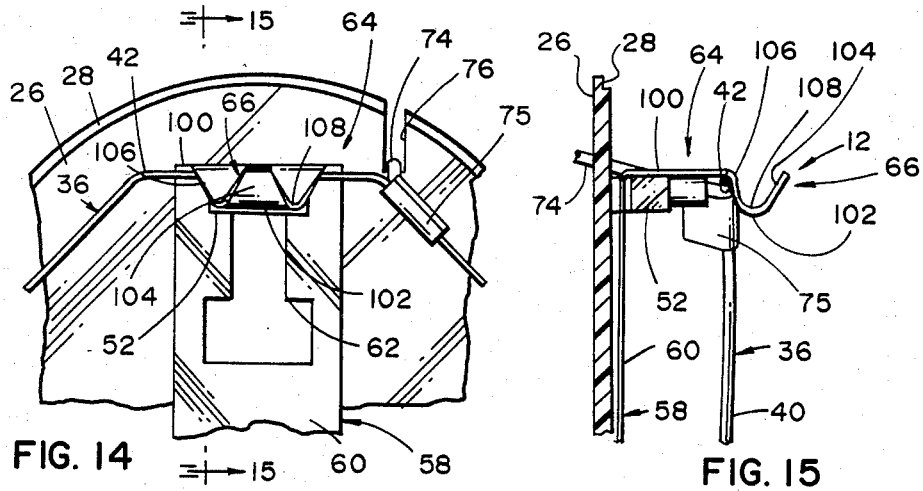
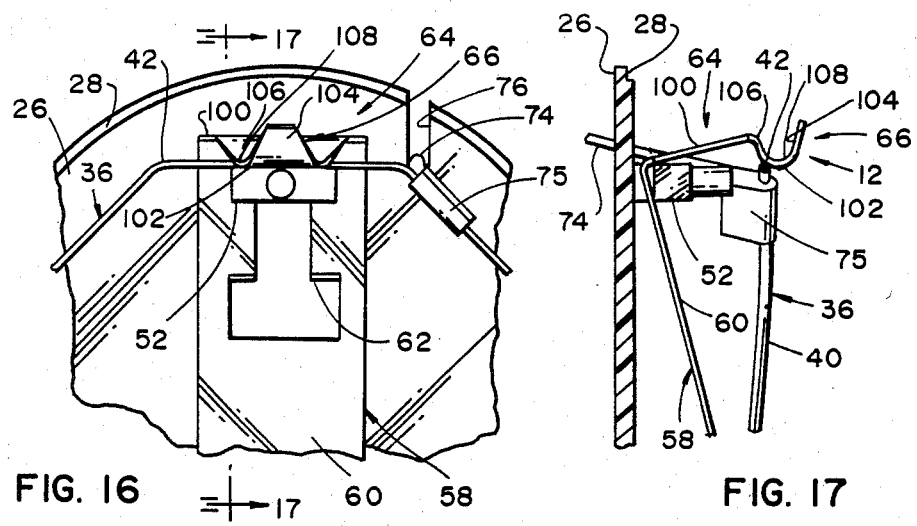

ENCLOSED MOUSETRAP HAVING IMPROVED TRAP MECHANISM

TECHNICAL FIELD

This invention relates to enclosed mousetraps of the type having a back wall mounted trap mechanism.

BACKGROUND ART

One of the most commonly used traps for mice and rats includes a flat rectangular wooden base with a pivotally mounted spring loaded bail wire which is held in a loaded condition by point contact with a wire rod engaged under a tripping device that holds the trap bait so that the bail wire is sprung when the bait is disturbed. Although this type of trap is relatively inexpensive, it is dangerous to use in places where there are small children and pets because it is so open and exposed. It is also very repulsive and unsightly when a mouse or rat is caught and killed in it. Another problem is that the open access available from all sides enables the bait to be approached from behind or otherwise inside the sweep of the bail wire for smaller mice to thus take the bait without being caught or killed. Although there are other types of traps, some of which catch rather than kill the small animal, there is always the problem of removing the mouse or rat from the trap if it is to be used again. Otherwise, the whole trap must be thrown away. In every instance there is the problem of disposal before decomposition and resulting odors occur.

While there are also poisons and dehydrating tidbits used to entice, catch and kill mice, rats, and the like, these are dangerous to have around and cause a dying mouse or rat to crawl into an inaccessable place with the same decomposition and odor problem.

Mousetraps of the enclosed type having a back wall mounted trap mechanism solve many of the above problems and are illustrated in the Kaiser U.S. Pat. Nos. 3,992,803 and of Kaiser et al 4,216,606. Both of these mousetraps have a catching member that engages the associated bail wire with a point contact during movement to and from the cocked position. Such point contact can prevent the bail wire from being effectively released for catching an animal upon actuating movement of the trap mechanism by the animal.

Other enclosed mousetraps are disclosed by: U.S. Pat. Nos. 1,218,406 Jackson, 2,099,021 Landes, 2,492,957 Blair, and 2,684,553 Schroeder; and the United Kingdom Patent No. 179,305 of William Mark dated May 3, 1922. All of these enclosed mousetraps also have a bail wire that is engaged by a catching member with point contact as with the above Kaiser and Kaiser et al patents.

DISCLOSURE OF THE INVENTION

An object of the present invention is to provide an enclosed mousetrap having a back wall mounted trap mechanism of an improved construction that insures bail wire release from a cocked position upon trap mechanism actuation by a mouse or other rodent.

In carrying out the above object, the mousetrap includes an enclosed housing that is preferably molded from plastic and includes a housing member defining a passageway and having a front end that defines an access opening through which a rodent enters the housing. The access opening at the front end of the housing member is at ground level so as to not impede the entrance of the mouse into the housing. The housing also has a back wall that is preferable defined by a back wall member which is secured to the housing member to close the passageway at its back end.

A trap mechanism of the mousetrap is mounted on the back wall of the housing by assembly thereof to the back wall member prior to securement thereof to the housing member that defines the passageway. The trap mechanism includes a bail wire that is mounted on the back wall for movement between a generally vertical cocked position and generally horizontal tripped position. The bail wire has a generally U shape including a straight portion defining the closed end of its U shape. Legs of the bail wire are formed intergral with helical springs that are mounted on the back wall to provide a spring means for biasing the bail wire toward the tripped position.

A catching member of the trap mechanism has an upper end moveably mounted on the back wall and also has a lower end including a bait holder. At its upper end, the catching member includes a bail wire detent having a horizontal portion that projects forwardly from the back wall and also having a detent projection that projects downwardly from the horizontal portion. This detent projection has a lower surface that is engaged by the straight portion of the bail wire in a line contact during operation of the trap mechanism to insure effective operation. The detent projection includes a front ramp portion that is engaged by the straight portion of the bail wire with a line contact as the bail wire is moved from the tripped position to the cocked position and such engagement moves the detent projection upwardly to permit the straight portion of the bail wire to move to the rear of the detent projection. The detent projection also has a rear detent portion that engages the straight wire portion of the bail wire in a line contact in the cocked position to hold the bail wire until movement of the lower bait holder moves the detent projection to release the bail wire for spring biased movement toward the tripped position as the straight portion of the bail wire slides along the detent projection in a line contact relationship.

A tripping member is also preferably mounted on the back wall for movement that moves the catching member to release the bail wire from the cocked position without contact of the rodent with the bait held by the bait holder of the catching member. As the tripping member moves the catching member, the straight portion of the bail wire slides along the detent projection of the catching member in the line contact relationship that insures effective operation of the trap mechanism.

A pull of the mousetrap has a first end connected to the bail wire and has a second end extending outwardly through a notch in the back wall of the housing to permit manually actuated movement of the bail wire from the tripped position to the cocked position for setting the trap or for releasing any caught rodent.

In the preferred construction of the invention, the catching member is stamped from sheet metal, and the stamped detent projection has a generally V shape in a sideways direction with respect to the passageway defined by the housing. This stamped detent projection has a constantly decreasing width in a downward direction along the rear detent portion and in an upward direction along the front ramp portion such that there is line contact thereof with the bail wire in a constantly increasing length during cocking and in a constantly decreasing length as the trap mechanism is tripped. In addition, the detent projection also preferably includes a lower curved portion that extends between the front ramp portion and the rear detent portion.

The detent construction of the catching member is economical to manufacture while still being effective when used in a matter not previously possible with enclosed mousetraps of the back wall mounted trap mechanism type.

The objects, features and advantages of the present invention are readily apparent from the following detailed description of the best mode of carrying out the invention when taken in connection with the accompanying drawings.

BRIEF DESCRIPTION OF DRAWINGS

FIG. 5 is a partial front view illustrating a detent of a catching member of the trap mechanism;

FIG. 6 is a side view of the detent taken along the direction of line 6—6 in FIG. 5;

FIG. 7 is a top plan view of the detent taken along the direction of line 7—7 in FIG. 6;

FIG. 8 is a partial perspective view illustrating a back wall provided by a back wall member of the mousetrap housing and also illustrating the upper end of the catching member which is mounted thereon upon assembly;

FIG. 9 is a partial perspective view showing the catching member in its mounted relationship on the back wall;

FIG. 10 is a partial front view illustrating the catching member mounted on the back wall of the housing;

FIG. 11 is a sectional view taken in a sideways direction along the direction of line 11—11 in FIG. 10 to illustrate the catching member mounted on the back wall of the housing;

FIGS. 12 and 13 are respectively front and side partial views similar to FIGS. 10 and 11 but showing the trap mechanism as the bail wire is moved toward a cocked position;

FIGS. 14 and 15 are respectively front and side partial views similar to FIGS. 12 and 13 but showing the trap mechanism in the cocked position; and FIGS. 16 and 17 are respectively front and side partial views similar to FIGS. 14 and 15 but showing the trap mechanism as it is being tripped to release the bail wire that catches the mouse or other rodent.

BEST MODE OF CARRYING OUT THE INVENTION

Figure 1:
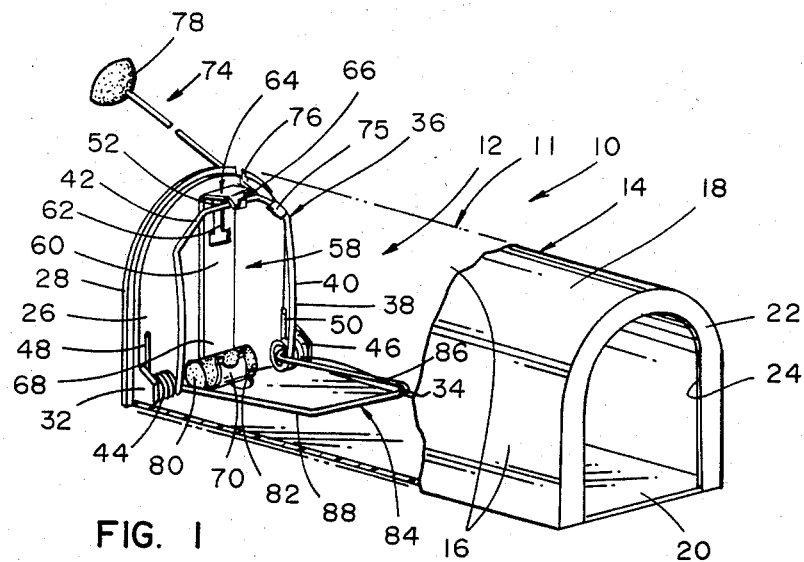
FIG. 1 is a perspective view of an enclosed mousetrap constructed in accordance with the present invention and having a housing member thereof partially broken away to show a back wall mounted trap mechanism.

Referring to FIG. 1, an enclosed mousetrap constructed according to the present invention is generally indicated at 10. The mousetrap 10 includes a housing 11 and a back wall mounted trap mechanism 12 as is hereinafter more fully described.

The mousetrap housing 11 includes a unitary housing member 14 which is molded from plastic and includes side walls 16, a curved roof portion 18 and a bottom wall 20. The housing member 14 provides a passageway of enclosed space with a sufficient length to receive and contain a mouse that has been induced to enter and become entrapped in the trap such that the dead body will be out of sight. Housing member 14 is also sufficiently narrow to generally preclude any movement of the mouse entering the housing in other than head-on movement toward the back wall mounted trap mechanism 12. More specifically, the housing member 14 prevents the animal from approaching the trap mechanism 12 from either side or the rear as will be more fully hereinafter described.

A front end of the housing is provided with a front wall 22 that defines a mouse hole opening 24 simulating an arched doorway. The back end of the housing member 14 is closed by a plastic molded back wall member 26 of the housing 11. This back wall member 26 defines a back wall on which the trap mechanism 12 is assembled and mounted before the back wall member is secured to the back end of the housing member 14. The back wall member 26 includes a shoulder stepped edge 28 which is formed and provided for fitting engagement and fastening thereof to the housing member 14 such as by adhesive bonding, heat sealing or otherwise. Back wall member 26 is also formed to include a pair of relatively spaced and outwardly projecting tabs generally indicated at 32 and 34. The projecting tabs 32 and 34 are integrally formed by plastic molding with the back wall member 26 on the inner face thereof near its lower edge. Projecting tabs 32 and 34 have integrally formed therewith opposing cylindrical projection portions 33 and 35, respectively, which provide support for the trap mechanism 12 as is more fully described below.

Figure 3:
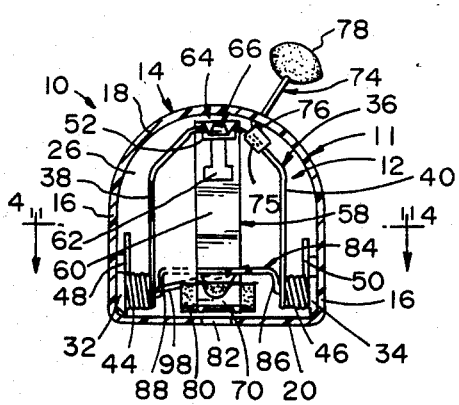
FIG. 3 is a cross-sectional view of the mousetrap taken along the direction of line 3—3 of FIG. 2.
Figure 4:
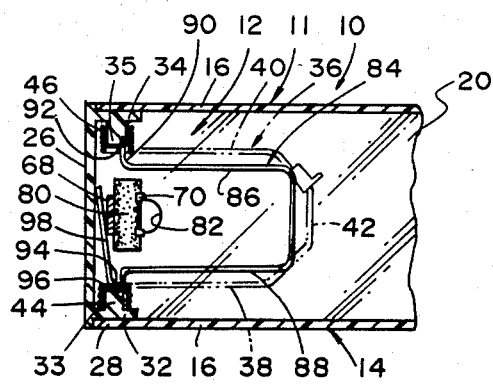
FIG. 4 is a partial top plan view of the mousetrap taken in section along the direction of line 4—4 of FIG. 2.

Trap mechanism 12 includes a bail wire 36 of a U shape having side arms 38 and 40, a cross wire having a straight portion 42, and a pair of torsion springs 44 and 46 integrally formed at opposite ends of the side arms 38 and 40, respectively. Upon assembly, the torsion springs 44 and 46 respectively receive the tab portions 33 and 35 as best shown in FIG. 4 to provide pivotal mounting of bail wire 36 on the back wall member 26. Each of the torsion springs 44 and 46 has a corresponding tang 48 and 50, respectively, for engagement with the back wall member 26 in the mounted relationship. Bail wire 36 has a generally vertical cocked position where it is held near the back wall member 26 under the torsion load of the springs 44 and 46 as shown by solid line representation in FIGS. 1, 2, and 3. Torsion springs 44 and 46 move the bail wire 36 to the generally horizontal tripped position shown by phantom line representation in FIG. 4 when the trap mechanism 12 is tripped as is hereinafter more fully described.

As best illustrated in FIG. 8, a T-shaped nib 52 is integrally formed on the back wall member 26 and provides support thereon of a catching member 58 of trap mechanism 12. This catching member 58 is preferably stamped from sheet metal and includes a vertical portion 60 as well as an upper end provided with an inverted T-shaped slot 62. The upper end of catching member 58 also has an upper bail wire detent 64 which has a downwardly projecting detent projection 66 that is hereinafter more fully described. A lower end 68 of the catching member 58 is formed to provide a bait holder 70 that will be hereinafter described in greater detail.

Figure 2:
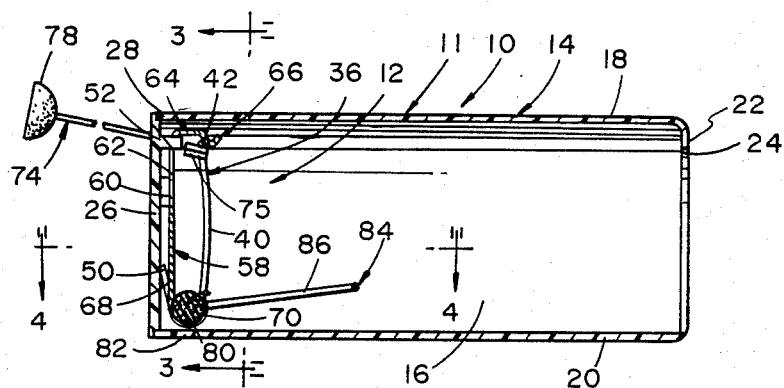
FIG. 2 is a longitudinal sectional view of the mousetrap.

The catching member 58 is loosely mounted on the T-shaped nib 52 so as to be pivotally movable about the nib 52 in a plane parallel to the plane of the back wall member 26 and movable to a limited extent in the direction perpendicular to the back wall member. The nib 52 is initially inserted through the lower end of the inverted T-shaped slot 62 in the catching member 58. Downward movement of the catching member 58 then positions the stem of the T-shaped nib 52 in the stem of the inverted T-shaped slot 62 with the upper bail wire detent 64 resting on the top surface of the nib. The stem width of the inverted T-shaped slot 62 is slightly greater than the stem width of the T-shaped nib 52 such that the catching member 68 is relatively free to swing on the nib 52. Also, the height of slot 62 is such that after assembly the upper end of catching member 58 engages the upper housing wall 18 before the nib 52 moves into alignment with lower end of the slot. As such, the catching member 58 is thereby retained on the back wall member 26 after securement thereof to the housing member 14. The weight of the lower bait holder 70 normally positions the upper detent projection 66 for interfering engagement with the cross wire straight portion 42 of bail wire 36. In the cocked position, the straight portion 42 of the bail wire 36 is held behind the detent projection 66 as shown in FIG. 2 and as is hereinafter more fully described.

A light nylon or otherwise strong flexible pull generally indicated at 74 is fastened to the bail wire 36 by a grooved integrally formed snap member 75. The one angled wire section adjacent the cross wire straight portion 42 is snapped into the groove of the snap member 75 near the top of the adjacent side arm 40. The pull 74 is fed into a small notch 76 in the back wall member 26 at the upper edge therof. The length of the pull 74 includes a ball section 78 integrally formed on the outside end thereof for finger gripping purposes in pulling the bail wire 36 to its cocked or set condition. In actual practice the pull 74 need only be long enough to provide some slack when the trap 10 is tripped. The free hanging condition of a ball section 78 serves to indicate a cocked or untripped trap, while a raised ball 78 signals that the trap 10 has been tripped and has caught the prey within housing 11.

A small roll of cotton 80 or other absorbent material is provided in the bait holder 70 of the bail wire catching member 58. A small hole 82 shown in FIGS. 1-4 is provided through the bottom wall 20 of the housing member 14 immediately under the lower disposed end 68 of the catching member 58. A few drops of a liquid substance considered to attract and entice mice and like small rodents into the trap 10 may be dispensed through the hole 82 and onto the roll of cotton 80. The access hole 82 is relatively small and is completely obscure when the trap 10 is sitting flat on its bottom wall 20.

The trap mechanism 12 also preferably includes a tripping member generally indicated at 84 in FIGS. 1-4. The tripping member 84 has a pair of side arms 86 and 88 which have substantially the same length as the side arms 38 and 40 of bail wire 36. A first end or bent portion 90 of the side arm 86 is received as illustrated in FIG. 4 in a groove 92 formed in the outer surface of the projecting tab portion 35. The first end 90 of the side arm 86 is allowed to pivotally rotate in the groove 92 and is secured by the coils of the torsion spring 46. An elbow portion 94 is formed by the other side arm 88 and is pivotally disposed within a recess 96 defined by the end surface of the projecting tab portion 33 and the inner peripheral surface of the torsion spring 44.

The tripping member 84 also includes a return end 98 integrally formed with the elbow portion 94 and which engages the lower disposed end 68 of the catching member 58 as shown in FIG. 4 in order to move the catching member 58 out of catching engagement with the bail wire 36. When the tripping member 84 is moved downwardly by an animal, it pivots about the longitudinal axis of the projecting tab portions 33 and 35 and moves the return end 98 and the lower end 68 of the catching member 58 forwardly which moves the detent projection 66 upwardly to release the straight portion 42 of the bail wire 36.

To place the mousetrap 10 in use, the ball section 78 is grasped to tension the pull 74 and draw the bail wire 36 against the resistance of the torsion springs 44 and 46 up and back toward the back wall member 26. As the bail wire 36 is drawn up against the resistance of the torsion springs 44 and 46, the lower portion of the side arm 38 of the bail wire 36 slidably engages the elbow portion 94 of the tripping member 84 to pivotally move the tripping member 84 upward toward the position shown in the FIGS. 1-3. At the same time, the return end 98 of the tripping member 84 moves toward the back wall member 26 thereby allowing the catching member 58 to move toward the back wall member 26. The normally weighted, lower disposed end 68 of the catching member 58 causes the detent 64 to engage and hold the straight portion 42 of the bail wire 36 after it passes thereunder and the tension of the pull 74 is then released.

The trap 10 is then turned bottom side up so that a liquid bait may be applied through the bottom wall hole 82 onto the roll of cotton 80 held in the bait holder 70. The trap is then cocked and ready for use upon being placed in position resting on its bottom wall as shown in FIG. 1.

When a mouse enters the opening 24 and approaches the baited trap mechanism 12 on the back wall member 26, there is limited space and the scent of the bait permeates the enclosure. Consequently, the mouse is induced to and must approach head-on to the trap area and, upon closely approaching the bait, will trip the tripping member 84 while its head is positioned to be struck and caught by the bail wire 36 upon downward movement thereof the horizontal tripped position. The bail wire 36 is purposely close fitting relative to the side walls 16 of the housing member 14 to preclude any side access such that there is no approach a mouse can make from behind or to the side of the bail wire. After the trap is tripped, it may be disposed of or reused by being reset and emptied over a waste receptable.

From the foregoing, it is shown that a small and relatively inexpensive mousetrap can be made and provided which is essentially self-contained, which has improved means for springing the loaded trap and which can be baited and set without handling other than the outer housing part. It is also shown that the trap 10 is disposable and may be thrown away with the entrapped mouse after it has served its intended purpose to thereby avoid the unsightliness and distasteful chore otherwise involved in disposing of a mouse and the trap.

The trap is obviously safe for pets and small children since the trap mechanism 12 including the tripping member 84 is inaccessibly disposed on the back wall member 26 which is too far back for probing fingers in the mouse opening 24, the opening 24 being purposely too small for a small hand or an animal's paw.

With specific reference to FIGS. 5-11, the stamped metal detent 64 includes a horizontal portion 100 that projects forwardly from the back wall member 26 and rests on top of the T-shaped nib 52 in the assembled position. Detent projection 66 of the detent 64 projects downwardly from the outer end of the horizontal flange 100 and has a lower surface 102 that is engaged by the straight portion 42 of the bail wire 36 as illustrated in FIGS. 12-17 with a straight line contact during operation of the trap mechanism 12. Detent projection 66 has a front ramp portion 104 that is inclined with respect to the horizontal and engaged by the straigt portion 42 of the bail wire 36 as the bail wire is moved from the tripped position to the cocked position in the manner illustrated in the FIGS. 12 and 13. Such engagement of the straight portion 42 of the bail wire 36 moves the detent projection 66 upwardly to permit the straight portion of the bail wire to move to the rear of the detent projection as illustrated in FIGS. 14 and 15.

In the cocked position of FIGS. 14 and 15, a rear portion 106 of the detent projection 66 engages the straight portion 42 of the bail wire 36 in a line contact to hold the bail wire in the cocked position until the catching member 58 is moved by movement of the lower bait holder as previously described. Such movement of the catching member 58 moves the detent projection 66 to release the bail wire 36 for spring biased movement as previously described from the cocked position to the tripped position as the straight portion 42 of the bail wire slides along the lower surface 102 of the detent projection in a line contact relationship. During such movement, the bail wire movement momentarily raises the detent projection 66 as illustrated in FIGS. 16 and 17 to permit its forward movement to the tripped position.

The manner in which the straight portion 42 of the bail wire 36 engages the lower surface 102 of the detent projection 66 with a line contact relationship throughout the cocking and tripping operation of the trap mechanism insures effective operation of the mousetrap without the possibility of the bail wire not releasing due to becoming caught at a point contact which is a problem with prior art types of enclosed mousetraps of the type to which this invention relates.

As previously mentioned, the entire catching member 58 including its detent 64 is preferably stamped from sheet metal with the detent projection 66 having a generally V shape in a sideways direction with respect to the passageway of the mousetrap housing as best illustrated in FIG. 6. This stamped metal construction of the detent projection 66 provides an economical way of providing the line contact relationship of the detent projection with the straight portion 42 of the bail wire during the trap operation in the manner previously described.

As best illustrated in FIGS. 5, 7, and 8, the detent projection 66 has a constantly decreasing width in a downward direction along the rear detent portion 106 and in an upward direction along the front ramp portion 104. Such a construction provides the straight portion 42 of the bail wire its greatest length of line contact when in the cocked position of FIGS. 14 and 15 to provide the greatest capability of frictional engagement therebetween to hold the trap mechanism in its cocked position prior to tripping movement of the catching member 58. Upon animal actuated movement of the catching member 58, the straight portion 42 of the bail wire initially moves in a relative downward direction along the rear detent portion 106 and into a line contact relationship of a lesser length so that the length of frictional engagement therebetween is decreased to thereby accelerate the release of the trap mechanism and the rapid movement of the bail wire to the tripped position for catching the animal. Likewise, during the cocking movement as the straight portion 42 of the bail wire moves in a relative downward direction along the front ramp portion 104 as illustrated in FIGS. 12 and 13 and then upwardly along rear detent portion 106, the length of line contact with the lower surface 102 of the detent projection 66 is constantly increasing to insure effective latching in the cocked position where the length of line contact is greatest to provide the greatest frictional engagement.

It is also most preferable for the detent projection 66 to include a lower curved portion 108 that extends between the front ramp portion 104 and the rear detent portion 106 so as to essentially smooth out the transition of the vertex defined by the V shape of the downward projection. Curved portion 108 like the front ramp portion and rear detent portion 106 has a constantly decreasing width in a rear to front direction so as to facilitate the cocking and the release of the trap mechanism as previously described.

While a preferred embodiment of the trap has been shown and described herein in detail, those skilled in this art will recognize various alternative design embodiments for practicing the present invention as defined by the following claims.

What is claimed is:

1. A mousetrap comprising:
    a housing defining a passageway and having a front end including an access opening through which a rodent enters the housing, and said housing having a back end including a back wall that closes the passageway;
    a trap mechanism mounted on the back wall of the housing, said trap mechanism including a bail wire mounted on the back wall for movement between a generally vertical cocked position and a generally horizontal tripped position, said bail wire having a generally U shape including a straight portion defining the closed end of its U shape, spring means for biasing the bail wire toward the tripped position, a catching member having an upper end movably mounted on the back wall and also having a lower end including a bait holder, the upper end of the catching member including a bail wire detent having a horizontal portion that projects forwardly from the back wall and also having a detent projection that projects downwardly from the horizontal portion, said detent projection being stamped from sheet metal and having a generally V shape in a sideways direction with respect to the passageway, said detent projection having a lower surface that is engaged by the straight portion of the bail wire in a line contact during operation of the trap mechanism, said detent projection including a front ramp portion that is engaged by the straight portion of the bail wire in a line contact as the bail wire is moved from the tripped position to the cocked position and such engagement moving the detent projection upwardly to permit the straight portion of the bail wire to move to the rear thereof, the detent projection having a rear detent portion that engages the straight portion of the bail wire in a line contact in the cocked position to hold the bail wire until movement of the lower bait holder moves the detent projection to release the bail wire for spring biased movement toward the tripped position as the straight portion of the bail wire slides along the lower surface of the detent projection in a line contact relationship, and the detent projection having a constantly decreasing width in a downward direction along the rear detent portion and in an upward direction along the front ramp portion; and a pull having a first end connected to the bail wire and a second end extending outwardly from the housing to permit manually actuated movement of the bail wire from the tripped position to the cocked position.

2. A mousetrap as in claim 1 wherein the housing includes a molded plastic housing member defining the passageway and a molded plastic back wall member secured to the housing member.

3. A mousetrap as in claim 2 wherein the back wall member includes a T-shaped nib that projects forwardly and the upper end of the catching member including an inverted T-shaped slot that receives the T-shaped nib on the back wall member to provide the movable mounting of the catching member rearwardly of the detent projection.

4. A mousetrap as in claim 1, 2 or 3 wherein the detent projection includes a lower curved portion that extends between the front ramp portion having the downwardly decreasing width and rear detent portion having the upwardly decreasing width.

5. A mousetrap comprising:
a molded plastic housing including a housing member defining a passageway and having a front end including a ground level access opening through which a rodent enters the housing, and said housing having a back end including a back wall member secured to the housing member to provide a back wall that closes the back end of the passageway;

a trap mechanism mounted on the back wall member of the housing prior to securement thereof to the housing member, said trap mechanism including a bail wire mounted on the back wall for movement between a generally vertical cocked position and a generally horizontal tripped position, said bail wire having a generally U shape including a straight portion defining the closed end of its U shape, spring means for biasing the bail wire toward the tripped position, a catching member stamped from sheet metal and having an upper end movably mounted on the back wall and also having a lower end including a bait holder, the upper end of the catching member including a bail wire detent having a horizontal portion that projects forwardly from the back wall and also having a detent projection that projects downwardly from the horizontal portion, said detent projection having a generally V shape in a sideways direction with respect to the passageway and having a lower surface that is engaged by the straight portion of the bail wire in a line contact during operation of the trap mechanism, said detent projection including a front ramp portion that is engaged by the straight portion of the bail wire in a line contact as the bail wire is moved from the tripped position to the cocked position and such engagement moving the detent projection upwardly to permit the straight portion of the bail wire to move to the rear thereof, the detent projection having a rear detent portion that engages the straignt wire portion of the bail wire in a line contact in the cocked position to hold the bail wire until movement of the lower bait holder moves the detent projection to release the bail wire for spring biased movement toward the tripped position as the straight portion slides along the lower surface of the detent projection in a line contact relationship, the detent projection having a constantly decreasing width in a downward direction along the rear detent portion and in an upward direction along the front ramp portion, and the detent projection also having a lower curved portion that extends between the front ramp portion and rear detent portion; and a pull having a first end connected to the bail wire and a second end extending outwardly from the housing to permit manually actuated movement of the bail wire from the tripped position to the cocked position.

6. A mousetrap comprising:
a molded plastic housing including a housing member defining a passageway and having a front end including a ground level access opening through which a rodent enters the housing, and said housing having a back end including a back wall member secured to the housing member to provide a back wall that closes the back end of the passageway;

a trap mechanism mounted on the back wall member of the housing prior to securement thereof to the housing member, said trap mechanism including a bail wire mounted on the back wall for movement between a generally vertical cocked position and a generally horizontal tripped position, said bail wire having a generally U shape including a straight portion defining the closed end of its U shape, spring means for biasing the bail wire toward the tripped position, a catching member stamped from sheet metal and having an upper end movably mounted on the back wall and also having a lower end including a bait holder, the upper end of the catching member including a bail wire detent having a horizontal portion that projects forwardly from the back wall and also having a detent projection that projects downwardly from the horizontal portion and has a generally V shape in a sideways direction with respect to the passageway, said detent projection having a lower surface that is engaged by the straight portion of the bail wire in a line contact during operation of the trap mechanism, said detent projection including a front ramp portion that is engaged by the straight portion of the bail wire in a line contact as the bail wire is moved from the tripped position to the cocked position and such engagement moving the detent projection upwardly to permit the straight portion of the bail wire to move to the rear thereof, the detent projection having a rear detent portion that engages that straight wire portion of the bail wire in a line contact in the cocked position to hold the bail wire until movement of the lower bait holder moves the detent projection to release the bail wire for spring biased movement toward the tripped position as the straight portion slides along the lower surface of the detent projection in a line contact relationship, the detent projection having a constantly decreasing width in a downward direction along the rear detent portion and in an upward direction along the front ramp portion, and the detent projection also having a lower curved portion that extends between the front ramp portion and rear detent portion;

a tripping member mounted on the back wall member for movement that moves the catching member to release the bail wire from the cocked position without contact of the rodent with bait carried by the bait holder of the catching member; and a pull having a first end connected to the bail wire and a second end extending outwardly from the housing to permit manually actuated movement of the bail wire from the tripped position to the cocked position.

* * * * *